(12) United States Patent
Khalil et al.

(10) Patent No.: US 8,514,851 B2
(45) Date of Patent: Aug. 20, 2013

(54) MOBILE IPV6 AUTHENTICATION AND AUTHORIZATION BASELINE

(75) Inventors: Mohamed Khalil, Murphy, TX (US); Haseeb Akhtar, Garland, TX (US); Kuntal Chowdhury, Plano, TX (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/374,933

(22) Filed: Jan. 24, 2012

(65) Prior Publication Data

US 2012/0131644 A1     May 24, 2012

Related U.S. Application Data

(63) Continuation of application No. 11/103,678, filed on Apr. 12, 2005, now abandoned.

(60) Provisional application No. 60/562,049, filed on Apr. 14, 2004.

(51) Int. Cl.
*H04L 12/50* (2006.01)
*H04Q 11/00* (2006.01)

(52) U.S. Cl.
USPC ............................ 370/385; 370/338; 713/160

(58) Field of Classification Search
USPC .................. 370/255, 389, 392, 169, 171, 338; 713/160, 168, 169, 171
See application file for complete search history.

(56) References Cited

U.S. PATENT DOCUMENTS

| | | |
|---|---|---|
| 6,973,567 B1 | 12/2005 | Riley et al. |
| 7,107,620 B2 | 9/2006 | Haverinen et al. |
| 7,155,500 B2 | 12/2006 | Nikander |
| 7,249,255 B2 | 7/2007 | Anand |
| 7,380,124 B1 | 5/2008 | Mizell et al. |
| 7,475,241 B2 | 1/2009 | Patel et al. |
| 7,934,094 B2 * | 4/2011 | Oyama ........................ 713/168 |
| 8,126,148 B2 * | 2/2012 | Chowdhury et al. ......... 380/277 |
| 2002/0120844 A1 | 8/2002 | Faccin et al. |
| 2002/0147820 A1 * | 10/2002 | Yokote .......................... 709/229 |

(Continued)

FOREIGN PATENT DOCUMENTS

WO     2004049672 A2     6/2004

OTHER PUBLICATIONS

Oyama, Johnson & Kato, Ryoji; "Authentication Method"; Jun. 18, 2003; pp. 1-10, Figures 1-4.*

(Continued)

*Primary Examiner* — Christian Hannon
(74) *Attorney, Agent, or Firm* — Wolfe-SBMC (57) ABSTRACT

The invention consists of an authentication protocol for the Home Agent to authenticate and authorize the Mobile Node's Binding Update message. Two new mobility options compatible with RADIUS AAA are used to exchange a shared secret between the Home Agent and the Mobile Node so the Mobile Node can be authenticated.

A Mobile Node-AAA authenticator option is added to the Binding Update message. The Home Agent generates the Mobile Node-AAA authenticator as a shared secret that it communicates as authentication data to the RADIUS AAA server on the home network. The RADIUS AAA server authenticates the communication and generates an Access-Accept message with a Mobile Node-Home Agent authenticator option. After receipt at the Home Agent, a Binding Update message with the Mobile Node-Home Agent authenticator option is transmitted from the Home Agent to the Mobile Node to use as an authenticator.

22 Claims, 4 Drawing Sheets

(56) References Cited

U.S. PATENT DOCUMENTS

| | | |
|---|---|---|
| 2003/0084293 A1 | 5/2003 | Arkko et al. |
| 2003/0142673 A1 | 7/2003 | Patil et al. |
| 2003/0211842 A1 | 11/2003 | Kempf et al. |
| 2004/0008845 A1 | 1/2004 | Le et al. |
| 2004/0236937 A1 | 11/2004 | Perkins et al. |
| 2005/0198506 A1 | 9/2005 | Qi et al. |

OTHER PUBLICATIONS

3rd Generation Partnership Project 2 (3GPP2), "Wireless IP Network Standard", 3GPP2 (Dec. 10, 1999).
Rigney, C., et al., "RFC 2138: Remote Authentication Dial in User Service (RADIUS)", Internet Society (Apr. 1997).
Rigney, C. et. al., "RFC 2865: Remote Authentication Dial in User Service", Internet Society (Jun. 2000).
Aboba, B. et. al., "RFC 3162: RADIUS and IPv6", Internet Society (Aug. 2001).
Narten, T. et al., "RFC 2461: Neighbor Discovery for IP Version 6 (IPv6)", Internet Society (Dec. 1998).
Notification of Transmittal of the International Search Report and the Written Opinion of the International Searching Authority (Sep. 28, 2005).
Perkins, Charles; "AAA Registration Keys for Mobile IPv4"; Mobile IP Working Group (Mar. 29, 2004).
Patel, Alpesh, H. Akhtar, M. Khalil, and K. Chowdhury; "Authentication Protocol for Mobile IPv6"; Mobile IP Working Group (Feb. 2004).
Calhoun, Pat, T. Johansson, C. Perkins, and T. Hiller; Diameter Mobile IPv4 Application; AAA Working Group (Feb. 2004).
Chapter 9: Hash Functions and Data Integrity, XP-002345293.
Final Office Action, U.S. Appl. No. 11/103,768, (Apr. 4, 2011), 11 pages.
Final Office Action, U.S. Appl. No. 11/103,768, (Sep. 16, 2009), 10 pages.
Final Office Action, U.S. Appl. No. 11/103,768, (Dec. 11, 2008), 9 pages.
Non-Final Office Action, U.S. Appl. No. 11/103,768, (Apr. 6, 2007), 10 pages.
Non-Final Office Action, U.S. Appl. No. 11/103,768, (Apr. 9, 2008), 8 pages.
Non-Final Office Action, U.S. Appl. No. 11/103,768, (Apr. 23, 2010), 9 pages.
Notice of Allowance, U.S. Appl. No. 11/103,768, (Oct. 3, 2011), 7 pages.
Restriction Requirement, U.S. Appl. No. 11/103,768, (Sep. 19, 2007), 4 pages.

\* cited by examiner

MOBILE IPV6 AUTHENTICATION AND AUTHORIZATION BASELINE

RELATED APPLICATION DATA

This application is related to Provisional Patent Application Ser. No. 60/562,049 filed on Apr. 14, 2004, and Utility patent application Ser. No. 11/103,768 filed on Apr. 12, 2005, and priority is claimed for these earlier filings. These patent applications are incorporated by reference into this utility patent application.

TECHNICAL FIELD OF THE INVENTION

An authentication protocol using two mobility options for use on a packet-based mobile communication system.

BACKGROUND OF THE INVENTION

Present-day Internet communications represent the synthesis of technical developments begun in the 1960s. During that time period, the Defense Department developed a communication system to support communication between different United States military computer networks, and later a similar system was used to support communication between different research computer networks at United States universities.

The Internet

The Internet, like so many other high tech developments, grew from research originally performed by the United States Department of Defense. In the 1960s, Defense Department officials wanted to connect different types of military computer networks. These different computer networks could not communicate with each other because they used different types of operating systems or networking protocols.

While the Defense Department officials wanted a system that would permit communication between these different computer networks, they realized that a centralized interface system would be vulnerable to missile attack and sabotage. To avoid this vulnerability, the Defense Department required that the interface system be decentralized with no vulnerable failure points.

The Defense Department developed an interface protocol for communication between these different network computers. A few years later, the National Science Foundation (NSF) wanted to connect different types of network computers located at research institutions across the country. The NSF adopted the Defense Department's interface protocol for communication between the research computer networks. Ultimately, this combination of research computer networks would form the foundation of today's Internet.

Internet Protocols

The Defense Department's interface protocol was called the Internet Protocol (IP) standard. The IP standard now supports communication between computers and networks on the Internet. The IP standard identifies the types of services to be provided to users and specifies the mechanisms needed to support these services. The IP standard also describes the upper and lower system interfaces, defines the services to be provided on these interfaces, and outlines the execution environment for services needed in this system.

A transmission protocol, called the Transmission Control Protocol (TCP), was developed to provide connection-oriented, end-to-end data transmission between packet-switched computer networks. The combination of TCP with IP (TCP/IP) forms a system or suite of protocols for data transfer and communication between computers on the Internet. The TCP/IP standard has become mandatory for use in all packet switching networks that connect or have the potential for utilizing connectivity across network or sub-network boundaries.

A computer operating on a network is assigned a unique physical address under the TCP/IP protocols. This is called an IP address. The IP address can include: (1) a network ID and number identifying a network, (2) a sub-network ID number identifying a substructure on the network, and (3) a host ID number identifying a particular computer on the sub-network. A header data field in the information packet will include source and destination addresses. The IP addressing scheme imposes a sensible addressing scheme that reflects the internal organization of the network or sub-network. All information packets transmitted over the Internet will have a set of IP header fields containing this IP address.

A router is located on a network and is used to regulate the transmission of information packets into and out of computer networks and within sub-networks. Routers are referred to by a number of names including Home Agent, Home Mobility Manager, Home Location Register, Foreign Agent, Serving Mobility Manager, Visited Location Register, and Visiting Serving Entity. A router interprets the logical address of an information packet and directs the information packet to its intended destination. Information packets addressed between computers on the sub-network do not pass through the router to the greater network, and as such, these sub-network information packets will not clutter the transmission lines of the greater network. If an information packet is addressed to a computer outside the sub-network, the router forwards the packet onto the greater network.

The TCP/IP network includes protocols that define how routers will determine the transmittal path for data through the network. Routing decisions are based upon information in the IP header and entries maintained in a routing table. A routing table possesses information for a router to determine whether to accept the communicated information packet on behalf of a destination computer or pass the information packet onto another router in the network or sub-network. The routing table's address data enables the router to accurately forward the information packets.

The routing table can be configured manually with routing table entries or with a dynamic routing protocol. In a dynamic routing protocol, routers update routing information with periodic information packet transmissions to other routers on the network. This is referred to as advertising. The dynamic routing protocol accommodates changing network topologies, such as the network architecture, network structure, layout of routers, and interconnection between hosts and routers. Internet Control Message Protocol (ICMP) information packets are used to update routing tables with this changing system topology.

The IP-Based Mobility System

The Internet protocols were originally developed with an assumption that Internet users would be connected to a single, fixed network. With the advent of portable computers and cellular wireless communication systems, the movement of Internet users within a network and across network boundaries has become common. Because of this highly mobile Internet usage, the implicit design assumption of the Internet protocols has been violated.

In an IP-based mobile communication system, the mobile communication device (e.g. cellular phone, pager, computer, etc.) is called a mobile node. Typically, a mobile node changes its point of attachment to a foreign network while maintaining connectivity to its home network. A mobile node may also change its point of attachment between sub-networks in its home network or foreign network. The mobile node will always be associated with its home network and sub-network for IP addressing purposes and will have information routed to it by routers located on the home and foreign network. Generally, there is also usually a correspondence node, which may be mobile or fixed, communicating with the mobile node.

IP Mobility Protocols

During the formative years since the Internet was first established, Internet Protocol version 4 (IPv4) was recognized and adopted as the standard version of the Internet Protocol. With the advent of mobile IP and proliferation of computers and computer systems linked to the Internet, various limitations in the IPv4 standard and associated procedures have developed and emerged. In response, new standards are evolving and emerging.

The most pressing limitation in the IPv4 standard is the restriction on the number of possible IP addresses imposed by the 32-bit address field size. A newer standard, the Internet Protocol version 6 (IPV6), increases the size of the available address space 400% to 128 bits, which vastly increases the number of available addresses. While the 32-bit address field provides $2^{32}$ or approximately 4 billion IP address possibilities, a 128-bit field provides $2^{128}$ ($340 \times 10^{12}$) IP address possibilities.

A number of benefits emerge from this vastly larger available address field. First, there is little chance of exhausting the number of IP addresses. Second, a large address field allows aggregation of many network-prefix routers into a single network-prefix router. Finally, the large address pool allows nodes to auto configure using simple mechanisms. One practical advantage as a result is elimination of designated foreign agents to route information packets to a visiting mobile node on a foreign network.

IP Mobility Care-of Addressing

In a mobile IP network, nodes will transmit notification and discovery information packets onto the network to advertise their presence on the network and solicit advertisements from other nodes. While on a foreign network, a mobile node will be assigned a care-of address that will be used to route information packets to the foreign network and the attached mobile node. An advertisement from a router on the foreign network will inform a mobile node that is attached to a foreign network. The mobile node will typically create a care-of address on the foreign network, which it will transmit to its home network in an information packet to register the care-of address. Information packets addressed to the mobile node on the home network have the care-of address added. This information packet containing the care-of address will then be forwarded and routed to the mobile node on the foreign network by a router on the foreign network according to the care-of address.

Mobile IP Extensions

Extensions have been defined in the IP protocol, and extensions can be used in similar protocols, to support transmission of variable amounts of data in an information packet. This includes address information for mobile nodes, routers, and networks. The extension mechanism in IP permits appropriate addressing and routing information to be carried by any information packet, without restriction to dedicated message types such as discovery, notification, control, and routing information packet formats.

The IPv6 header minimizes header overhead. Compared to IPv4, nonessential fields and option fields have been moved to extension headers inserted after the IPv6 header. The extension header mechanism of IPv6 is part of the data payload so that intermediate routers are not affected by processing the extension headers.

Figure 1:
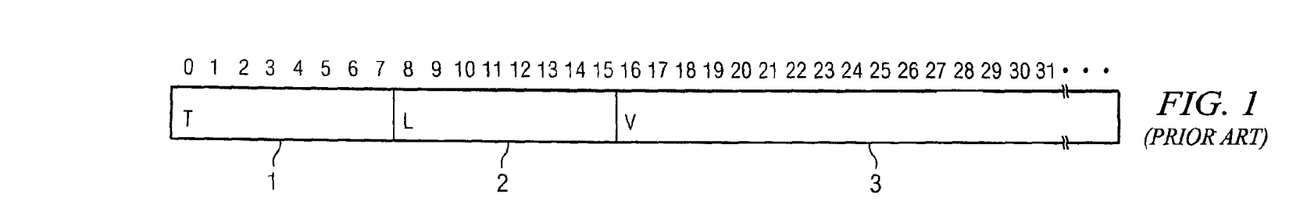
FIG. 1 is a general extension format.

The general extension format is found in FIG. 1 in a Type-Length-Value format. As shown in FIG. 1, the Type data field (T) 1 occupies the first 8-bits (one octet) of the general extension. The value of this data field will designate the type of extension. The Length data field (L) 2 occupies the next 8-bits of the extension, and the value assigned is the length of the Value field (V) 3 in octets. The Value data field 3 occupies the remaining bits in the general extension as specified by the Type 1 and Length 2 data values.

Mobile IPv6 Movement Detection and Binding

Upon moving to a new network, a mobile node detects its movement by receipt of a Router Advertisement message from a new router or exceeding the time interval for receiving an expected Router Advertisement message from a linked router. A mobile node can also periodically transmit a Router Solicitation message that will be received by a router on the foreign network and initiate transmission of a Router Advertisement message received by the mobile node.

The Router Advertisement message contains network prefix information that is used to form a care-of address for routing information packets from the home network to the mobile node on the foreign network. A Binding Update message (BU) is used to register the care-of address with the home agent and any active correspondence node communicating with the mobile node. The new binding includes the care-of address, the home address, and a binding lifetime. A Binding Acknowledgment message (BA) is sent in response to the Binding Update message to either accept or reject the Binding Update as an authentication step. A Correspondence Node can send a Binding Request message (BR) to a mobile node to discover the care-of address for the mobile node, and a Binding Update will typically be sent to the Correspondence Node in response. The Binding Request is generally used to refresh a binding nearing expiration of the designated lifetime of the binding. Routers on the networks will maintain the care-of address and home IP address association for the mobile node on a data table, ensuring that information packets can be routed to a mobile node connected to the foreign network.

Authentication, Authorization and Accounting ("AAA")

In an IP-based mobile communications system, the mobile node changes its point of attachment to the network while maintaining network connectivity. When a mobile node travels outside its home administrative domain, however, the mobile node must communicate through multiple domains in order to maintain network connectivity with its home network. While connected to a foreign network controlled by another administrative domain, network servers must authenticate, authorize and collect accounting information for services rendered to the mobile node. This authentication, authorization, and accounting activity is called "AAA", and AAA servers on the home and foreign network perform the AAA activities for each network.

Authentication is the process of proving one's claimed identity, and security systems on a mobile IP network will often require authentication of the system user's identity before authorizing a requested activity. The AAA server authenticates the identity of an authorized user and authorizes the mobile node's requested activity. Additionally, the AAA server will also provide the accounting function including tracking usage and charges for use of transmissions links between administrative domains.

Another function for the AAA server is to support secured transmission of information packets by storing and allocating security associations. Security associations refers to those encryption protocols, nonces, and keys required to specify and support encrypting an information packet transmission between two nodes in a secure format. The security associations are a collection of security contexts existing between the nodes that can be applied to the information packets exchanged between them. Each context indicates an authentication algorithm and mode, a shared or secret key or appropriate public/private key pair, and a style of replay protection.
RADIUS AAA Remote Authentication Dial In User Service (RADIUS) is one widely utilized protocol for AAA. The RADIUS protocol defines message formats and data required for AAA that can be used on virtually any packet-based communication system. Functionally, RADIUS can perform client-server operations, network security, authentication, and accounting using a standard information encoding under a UDP transmission protocol. RADIUS AAA server computers are widely deployed over wireless networks utilizing the RADIUS protocol to perform AAA functions.

Under existing procedures, there is a no mechanism to authenticate the Binding Update message sent from the Mobile Node to the Home Agent. A mechanism for authentication cannot depend on a static Security Parameter Database and must, instead, utilize other identity credentials included in the Binding Update message. The authentication protocol must also allow autoconfiguration of a dynamic Home Address.

SUMMARY OF THE INVENTION

The invention consists of a new authentication protocol for the Home Agent to authenticate and authorize the Mobile Node's Binding Update message. Two new mobility options compatible with RADIUS AAA are used to exchange a shared secret between the Home Agent and the Mobile Node so the Mobile Node can be authenticated.

The Home Agent functions as a RADIUS client. The Binding Update message includes Mobile Node authentication data as a Mobile Node-AAA authenticator option. The Home Agent generates the Mobile Node-AAA as a shared secret that it communicates as authentication data to the RADIUS AAA server on the home network. The RADIUS AAA server authenticates the communication and generates an Access-Accept message with a Mobile Node-Home Agent authenticator. A Binding Update message with the Mobile Node-Home Agent authenticator option is transmitted from the Home Agent to the Mobile Node to use as an authenticator. The authenticator has an inverse calculation performed to derive a shared secret between the Mobile Node and the Home Agent that is used to secure information packets transmitted between the Mobile Node and the Home Agent.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figures 2, 3, 7:
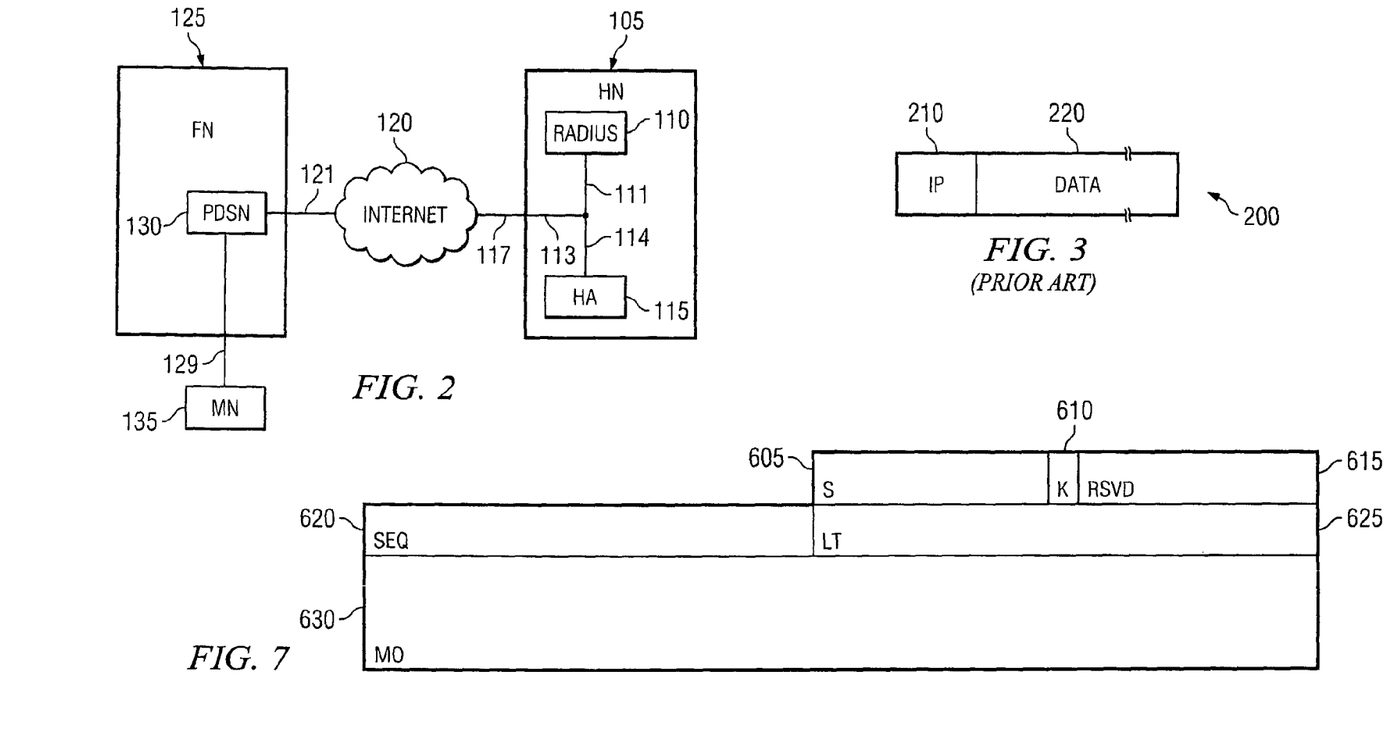
FIG. 2 is a diagram of a mobile IP wireless communication network compatible with Mobile IPv6.
FIG. 3 is the general format for an information packet.
FIG. 7 is a Binding Acknowledgement message.

FIG. 2 shows an embodiment for a mobile IP cellular communication network compatible with Mobile IPv6 using the invention. A home network 105 consists of a RADIUS Authentication, Authorization, and Accounting (RADIUS) server 110. The RADIUS server 110 is connected to a buss line 113 by communication link 111. A home agent (HA) 115 is connected to the buss line 113 by communication link 114. Communication link 117 connects the buss line 113 that is connected to the RADIUS server 110 and the HA 115 to the Internet 120. A communication link 121 connects the Internet 120 to a Packet Data Serving Node (PDSN) 130 on a foreign network 125. Communication link 129 connects the PDSN 130 to the Mobile Node (MN) 135, and this communication link includes a wireless connection. The Mobile Node 135 can be a communication device, such as a cellular phone, a computer, a router, a personal data assistant (PDA) and handheld terminal, or some other type of host.

The Mobile Node 135 is associated with the Home Agent 115. Information packets sent to the Mobile Node 135 on the home network 105 are routed to the Mobile Node 135 while linked to the foreign network 130. The Home Agent 115 stores an address association in its memory corresponding to the location of the Mobile Node 135 on the foreign network 125. The address association includes the Internet Protocol address of the Mobile Node 135 on the home network 105 and the care-of address corresponding to the topological location of the PDSN 130. As the Mobile Node 135 moves from network to network, the various routing tables and other data tables must be updated to maintain communication with the Mobile Node 135 thereby ensuring the correct routing of information packets.

When Mobile Node 135 movement results in a change in connectivity, the Mobile Node's 135 care-of address must be updated so that the correct router associations on both the home agent 115 and the PDSN 130 are maintained. Hand-off procedures involve assignment of a care-of address for the home agent 115 to transmit an information packet through the Internet 120, so that the PDSN 130 can route the information packet to the connected Mobile Node 135.

The general format of an information packet used on packet-based communication systems is shown in FIG. 3. Information packets use an encoding format of "1" and "0" data bits to build a data stream that a computer can interpret. The information packet 200 has an IP address header 210 that provides routing instructions for transport over an IP communication system. The actual length and configuration of the IP header 210 is dependent on the actual communication protocol being used (e.g. IPv4 or IPv6). The information packet 200 also contains a variable length data field 220 that contains the actual information being transmitted from the originating source to the destination source.

Figure 4:
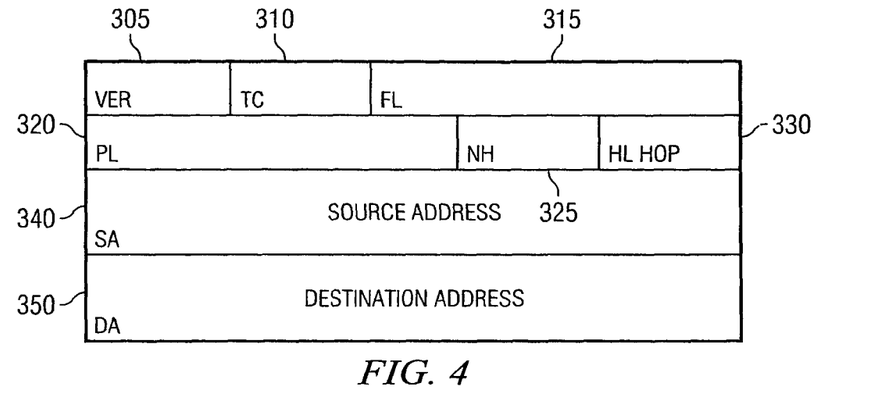
FIG. 4 is the format for an IPv6 Header.

FIG. 4 is the IP header format for the IPv6 protocol. The Version (V) 4-bit data field 305 has a value of "6" and designates the header as an IPv6 protocol packet. The Traffic Class (TC) 8-bit data field 310 is available to identify and distinguish between different classes or priorities of IPv6 packets.

The Flow Label (FL) 20-bit data field 315 is used by a source to label sequences of packets for special handling by routers. The Payload Length (PL) 16-bit data field 320 specifies the length of the IPv6 payload in octets or bytes. The Next Header (NH) 8-bit data field 325 identifies the type of header immediately following the IPv6 header. The Hop Limit (HL) 8-bit data field 330 is decremented by 1 for each node that forwards the packet. If the field value reaches zero, then the packet is discarded. The Source Address (SA) 128-bit data field 340 contains the IP address of the originator of the packet, and the Destination Address (DA) 128-bit data field 350 contains the IP address of the intended recipient of the packet.

Figure 5:
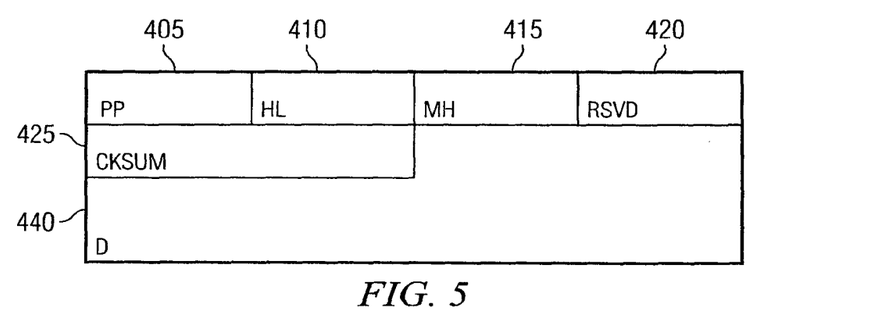
FIG. 5 is the general format for a Mobility Header payload extension.

FIG. 5 is the general format for a Mobility Header payload extension as used in the invention. The Mobility Header is inserted after the IPv6 Header. The Payload Proto (PP) 8-bit data field 405 identifies the type of header immediately following the Mobility Header. The Header Length (HL) 8-bit data field 410 is the length of the Mobility Header in octets or bytes, excluding the first 8 bytes. The MH Type data field 415 identifies the particular mobility message. The Reserved (RSVD) 8-bit field 420 is reserved for future use. The Checksum (CKSUM) 16-bit data field 440 is calculated from the octet string consisting of a "pseudo-header" followed by the entire Mobility Header and is the complement sum of the string. The Message Data (D) variable length data field 440 contains the data specific to the message being communicated to the node.

Figure 6:
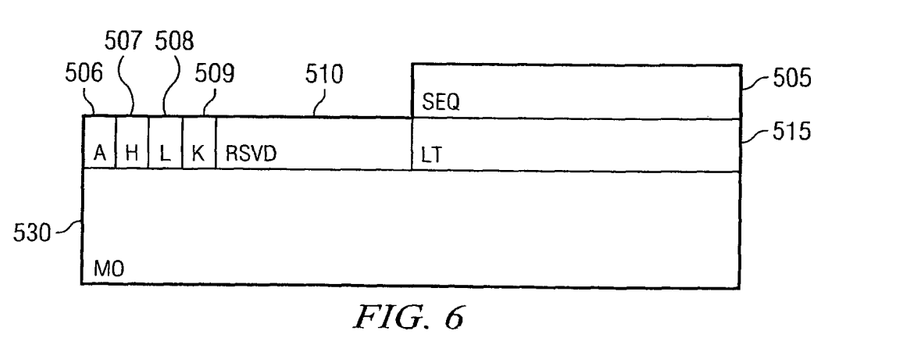
FIG. 6 is a Binding Update message.

FIG. 6 shows a Binding Update message (BU) extension format. This extension occupies the Message Data data field of FIG. 5. The Sequence Number (SEQ) 16-bit data field 505 is used to sequence Binding Updates received by a receiving node and to match a returned Binding Acknowledgement by a sending node. The Acknowledge (A) one-bit data field 506 is set by the sending mobile node to request a Binding Acknowledgement. The Home Registration (H) one-bit data field 507 is set by the mobile node to request that the receiving node should act as the mobile node's home agent. The Link-Local Address Capability (L) one-bit data field 508 is set when the reported home address has the same interface identifier as the mobile node's link-local address. The Key Management Mobility Capability (K) one-bit data field 509, if cleared, indicates that the protocol for establishing IP security associations between the mobile node and the home agent does not survive movements. This bit is valid only for Binding Updates sent to the home agent. The Reserved (RSVD) 8-bit field 510 is reserved for future use. The Lifetime (LT) 16-bit data field 520 indicates the number of time units remaining before the binding expires. Each time unit is four seconds. The Mobility Options (MO) variable-length data field 530 contains any mobility options. The care-of address can be specified in either the Source Address field of the IPv6 header or in the mobility option data field. In the invention, the Mobility Option field 530 contains a Mobile Node-AAA authenticator.

FIG. 7 shows a Binding Acknowledgment message (BA) extension format. The extension occupies the Message Data data field of FIG. 5. The Status (S) 8-bit data field 605 indicates the disposition of the Binding Update message, with values of less than 128 indicating that the BU message was accepted by the receiving node. The Key Management Mobility Capability (K) one-bit data field 610, if cleared, indicates that the protocol for establishing IP security associations between the mobile node and the home agent does not survive movements. The Reserved (RSVD) 8-bit field 615 is reserved for future use. The Sequence Number (SEQ) 16-bit data field 620 is copied from the Sequence Number field in the BU and is used by the mobile node to match the BA with an outstanding BU. The Lifetime (LT) 16-bit data field 625 indicates the number of time units remaining before the binding expires. Each time unit is four seconds. The Mobility Options (MO) variable-length data field 630 contains any mobility options. The care-of address can be specified either in the Source Address field of the IPv6 header or in the mobility option data field. In the invention, the Mobility Option field 630 contains a Mobile Node-HA authenticator.

Figure 8:
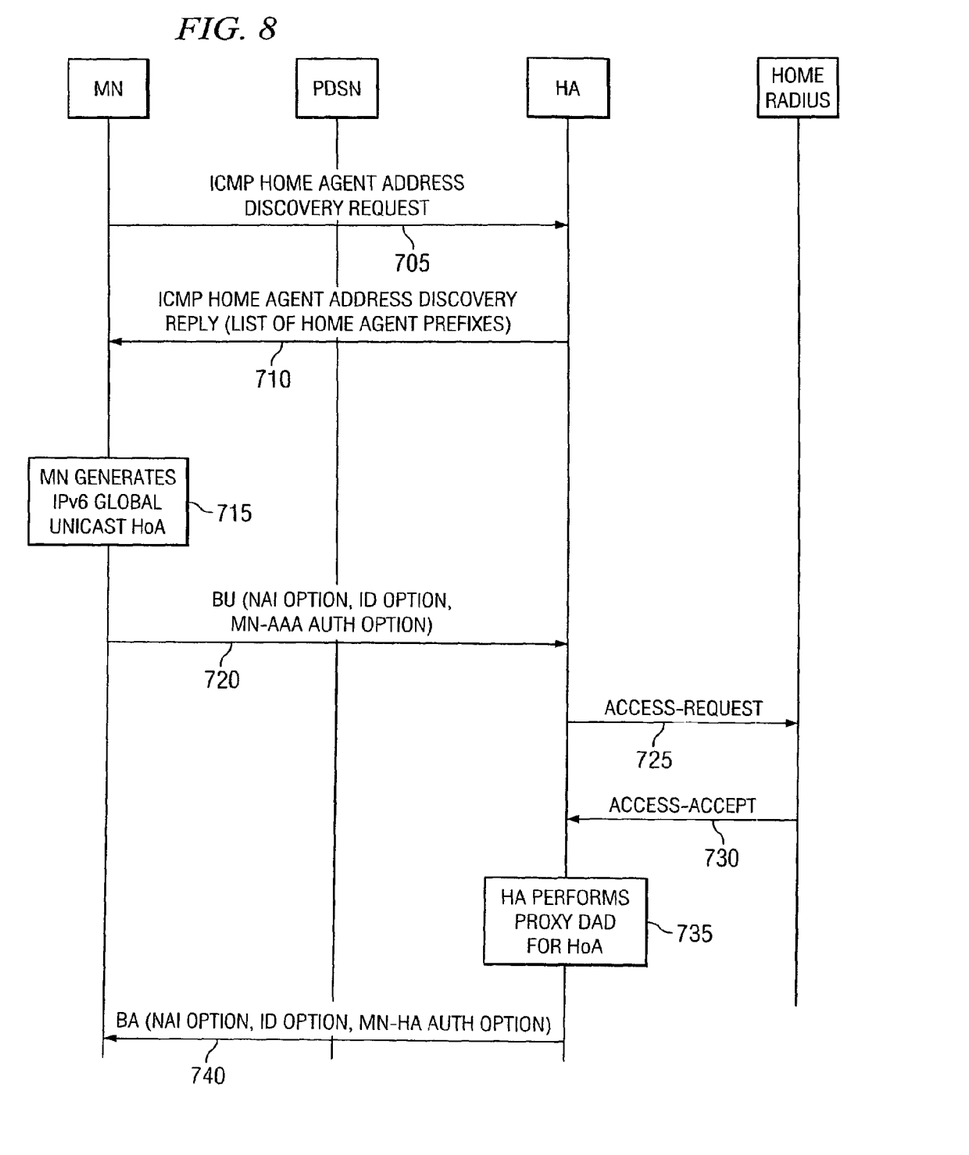
FIG. 8 is the message flow of the invention for authentication and authorization of the Mobile Node using the MN-AAA authentication option.

FIG. 8 is one embodiment for the message flow of the invention for authentication and authorization of the Mobile Node using the MN-AAA and MN-HA authentication option. In step 705, the Mobile Node generates an ICMP Discovery Request message to discover HAs on the home network provisioned in the Mobile Node. Receipt of the ICMP Discovery Request message causes the recipient home agent to generate an ICMP Discovery Reply message that is transmitted to the home agent in step 710. This ICMP Discovery Reply message includes a list of available HA prefixes that can be used to support a communication session by the Mobile Node. In step 715, the Mobile Node autoconfigures an IPv6 global unicast address based on the prefix of the selected Home Agent from the list received in step 710.

In step 720, a Binding Update (BU) message is generated containing an IPv6 header, a destination option header, and a mobility header. The BU is transmitted to the selected Home Agent. If the Mobile Node wants the Home Agent to defend (through proxy Duplicate Address Detection (DAD)) it's link-local and global addresses created with the same address, the Link-Local Address Capability (L) data field is set for "1". If this bit is set to "0", the Mobile Node wants to use privacy. The BU message also includes three mobility options: 1) a MN-AAA authentication option, 2) a NAI Option, and 3) an ID option. The MN-AAA authenticator is generated using a shared secret allocated to the Mobile Node upon initial subscription to the communication service to calculate the MN-AAA authenticator.

Upon receipt, the Home Agent in step 725 checks for replays using the ID option in the BU. If the ID check succeeds, the Home Agent generates and transmits a RADIUS Access-Request message to the Home RADIUS server. The Home Agent acts as a RADIUS client to communicate the MN-AAA authenticator information to the RADIUS server. The MN-AAA authenticator and NAI option from the BU message in step 720 are extracted and included in a RADIUS Access-Request message. In step 730, the Home RADIUS server authenticates and authorizes the user. To authenticate the Access-Request message, the RADIUS server performs an inverse calculation on the MN-AAA authenticator to derive the shared secret, which authenticates the Access Request message. The RADIUS server then generates an Integrity Key (IK) using an algorithm to transmit back to the Mobile Node.

A RADIUS Access-Accept message is generated at step 730 containing the IK and indicates successful authentication and authorization. In step 735, the Home Agent performs proxy DAD on the Mobile Node's home address (global and local link) using proxy Neighbor Solicitation to the Mobile Node. In step 740, if the DAD is successful, the Home Agent generates and transmits a Binding Acknowledgement (BA) message to the Mobile Node. In this BA message, the Home Agent includes three mobility options: 1) a MN-HA authentication option, 2) a NAI Option, and 3) an ID option. The Home Agent calculates the MN-HA authenticator using the IK transmitted from the RADIUS server using an algorithm. After receipt of the BA message, the Mobile Node performs the inverse calculation to generate the IK, which is then used as a shared secret for securing information packet transmissions between the Mobile Node and the Home Agent during the communication session.

Figure 9:
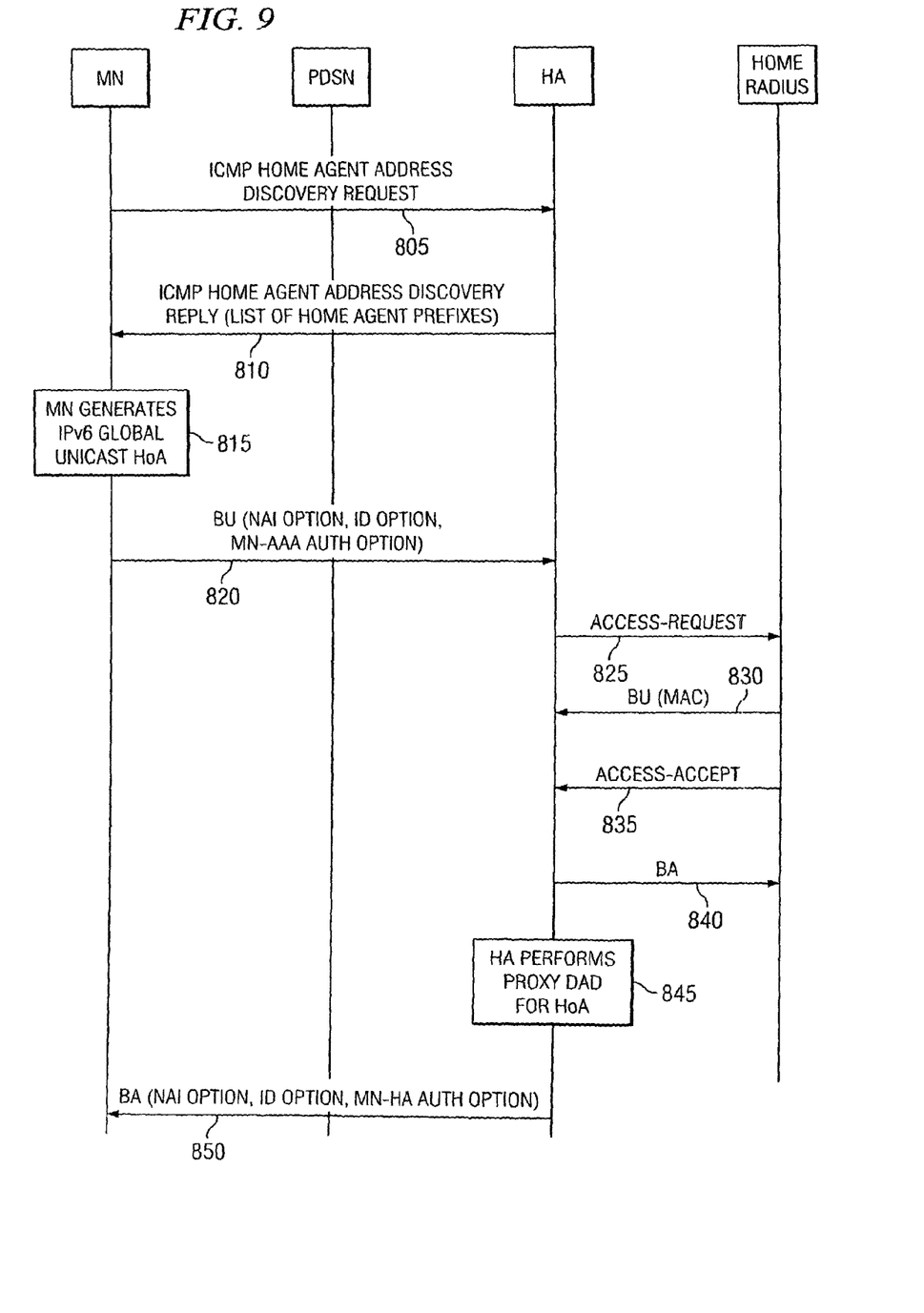
FIG. 9 is the message flow of the invention for authentication and authorization of the Mobile Node using the MN-HA authentication option

FIG. 9 is a second embodiment for the message flow of the invention for authentication and authorization of the Mobile Node using the MN-AAA and MN-HA authentication option. In step 805, the Mobile Node generates an ICMP Discovery Request message to discover HAs on the home network provisioned in the Mobile Node. Receipt of the ICMP Discovery Request message causes the recipient home agent to generate an ICMP Discovery Reply message that is transmitted to the home agent in step 810. This ICMP Discovery Reply message includes a list of available HA prefixes that can be used to support a communication session by the Mobile Node. In step 815, the Mobile Node autoconfigures an IPv6 global unicast address based on the prefix of the selected Home Agent from the list received in step 810.

In step 820, a Binding Update (BU) message is generated containing an IPv6 header, a destination option header, and a mobility header. The BU is transmitted to the selected Home Agent. If the Mobile Node wants the Home Agent to defend (through proxy Duplicate Address Detection (DAD)) it's link-local and global addresses created with the same address, the Link-Local Address Capability (L) data field is set for "1". If this bit is set to "0", the Mobile Node wants to use privacy. The BU message also includes three mobility options: 1) a MN-AAA authentication option, 2) a NAI Option, and 3) an ID option. The MN-AAA authenticator is generated using a shared secret allocated to the Mobile Node upon initial subscription to the communication service to calculate the MN-AAA authenticator using an algorithm.

Upon receipt, the Home Agent in step 825 checks for replays using the ID option in the BU. If the ID check succeeds, the Home Agent generates and transmits a RADIUS Access-Request message to the Home RADIUS server. The Home Agent acts as a RADIUS client to communicate the MN-AAA authenticator information to the RADIUS server. The MN-AAA authenticator and NAI option from the BU message in step 820 are extracted and included in the Access-Request message. In this embodiment, rather than using a calculated IK transmitted back to the Home Agent in an Access-Accept message, a Message Authentication Code (MACs), also called a "keyed hash", is generated. In step 830, the Home RADIUS server authenticates and authorizes the user. To authenticate the received message, the MN-AAA is used in an inverse calculation to derive the shared secret, which authenticates the Access Request message.

A MAC value is then calculated using the shared secret in an algorithm. A BU containing the MAC is then generated and transmitted to the Home Agent by the RADIUS server. The RADIUS server then generates and transmits an Access-Accept message back to the Home Agent indicating successful authentication and authorization by the Mobile Node in step 835. In step 840, a BA message is generated by the server and transmitted to the Home Agent to confirm receipt of the BU.

In step 845, the Home Agent performs proxy DAD on the Mobile Node's home address (global and local link) using proxy Neighbor Solicitation to the Mobile Node. In step 850, if the DAD is successful, the Home Agent generates and transmits a Binding Acknowledgement (BA) message to the Mobile Node. In this BA message, the Home Agent includes three mobility options: 1) a MN-HA authentication option, 2) a NAI Option, and 3) an ID option. The Home Agent calculates the MN-HA authenticator using the MAC transmitted from the RADIUS server in an algorithm. After receipt of the BA message, the Mobile Node performs the inverse calculation to derive the MAC, which is then used as a shared secret for securing information packet transmissions between the Mobile Node and the Home Agent during the communication session.

The MN-AAA authenticator in the BU message is generated by the Mobile Node using one of the following authenticator options:

1) If the Mobile Node uses an SPI value of CHAP_SPI or HMAC_CHAP_SPI, then the following algorithms are used:
   MN-AAA Authenticator=First (96, HMAC_SHA1 (MN-AAA Shared Secret key, MAC_Mobility_Data))
   MAC_Mobility Data=MD5 (care-of address|home address|MH_Data) when using CHAP_SPI
   or
   MAC_Mobility Data=HMAC_MD5 (care-of address|home address|MH_Data) when using HMAC_CHAP_SPI 2) If the Mobile Node uses another SPI value, then the following MN-AAA authenticator calculation is used:
   MN-AAA Authenticator=First (96, HMAC_SHA1 (MN-AAA Shared Secret key, Mobility Data)
   Mobility Data=(care-of address|home address|MH_Data)
   MH_Data=data in mobility header
   MN-AAA Shared Secret key is provided upon subscription with the communication service.

The Home Agent acts as a RADIUS client. On receipt of the BU message, if the SPI in the BU is set to CHAP_SPI or HMAC_CHAP_SPI, the Home Agent creates a RADIUS Access-Request message as follows:
   CHAP-Password=
   CHAP-Ident=higher order byte of the ID field extracted from ID mobility option
   String=The MN-AAA authenticator extracted from the MN-AAA authentication option
   CHAP-Challenge=
   MD5 (care-of address|home address|MH Data) when SPI=CHAP_SPI
   or
   HMAC_MD5 (care-of address|home address|MH Data) when SPI=HMAC_CHAP_SPI.

The Home Agent calculates the MN-HA authenticator which is received by the Mobile Node in a BA message using one of the following algorithms:

1) MAC_Mobility Data extracted from the CHAP-Challenge attribute MN-HA Authenticator=First (96, HMAC_SHA1 (MN-AAA Shared key, MAC_Mobility_Data))
   where MAC_Mobility Data=HMAC_MD5 (care-of address|home address|MH_Data) MH_Data=data in mobility header 2) Distributed integrity key (IK)
   IK=SHA_1(MN-AAA Shared Secret, "Integrity Key"|ID, HA addr., HoA)
   HoA is home address and ID is body of the identification option
   MN-HA Authenticator=First (96, HMAC_SHA1 (IK, MAC_Mobility Data))
   where MAC_Mobility Data=HMAC_MD5 (care-of address|home address|MH_Data)

While the invention has been particularly shown and described with respect to preferred embodiments, it will be readily understood that minor changes in the details of the invention may be made without departing from the spirit of the invention. Having described the invention, we claim:

We claim:

1. A method of operating a home agent to establish a secured information packet communication between a mobile node in a first network and the home agent in a second network, the method comprising:

receiving, at the home agent in the second network, a binding update message from the mobile node in the first network, the binding update message containing a first authenticator data element, the first authenticator data element generated using a first algorithm and a first shared secret;

sending an authentication request message, that includes the first authenticator data element, to an authentication server on the second network effective to cause the authentication server to derive the first shared secret from the first authenticator data element and to generate a second shared secret using a second algorithm and the first shared secret;

receiving an authentication response message from the authentication server, the authentication response message including the second shared secret;

generating a second authenticator data element using the second shared secret; and     sending a binding acknowledgement message to the mobile node, the binding acknowledgement message containing the second authenticator data element.

2. The method of claim 1, wherein the binding update message is a Mobile IP Version 6 (MIPv6) binding update message.

3. The method of claim 1, wherein the authentication request message comprises an access request message.

4. The method of claim 1, wherein the authentication response message comprises an access accept message and the second shared secret comprises an integrity key.

5. The method of claim 1, wherein the authentication response message comprises a binding update message and the second shared secret comprises a message authentication code.

6. The method of claim 1, further comprising:
    receiving further messages from the mobile node; and
    decoding the further messages using the second shared secret.

7. A home agent configured to establish a secured information packet communication between a mobile node in a first network and the home agent in a second network, the home agent comprising:

a communication interface configured to:
        receive a binding update message from the mobile node, the binding update message containing a first authenticator data element, the first authenticator data element generated using a first algorithm and a first shared secret; and
        send an authentication request message, that includes the first authenticator data element, to an authentication server on the second network effective to cause the authentication server to derive the first shared secret from the first authenticator data element and to generate a second shared secret using a second algorithm and the first shared secret;
        receive an authentication response message from the authentication server, the authentication response message including the second shared secret;
    a message processor configured to generate a second authenticator data element using the second shared secret;
    the communication interface being further configured to send a binding acknowledgement message to the mobile node, the binding acknowledgement message containing the second authenticator data element.

8. The home agent of claim 7, wherein the binding update message is a Mobile IP Version 6 (MIPv6) binding update message.

9. The home agent of claim 7, wherein the authentication request message comprises an access request message.

10. The home agent of claim 7, wherein the authentication response message comprises an access accept message and the second shared secret comprises an integrity key.

11. The home agent of claim 7, wherein the authentication response message comprises a binding update message and the second shared secret comprises a message authentication code.

12. The home agent of claim 7, wherein:
    the communication interface is further configured to receive further messages from the mobile node; and
    the message processor is further configured to decode the further messages using the second shared secret.

13. A method of operating a mobile node to establish a secured information packet communication between the mobile node in a first network and a home agent in a second network, the method comprising:

generating, at the mobile node in the first network, a first authenticator data element from a first shared secret using a first algorithm;

sending a binding update message to the home agent, the binding update message containing the first authenticator data element;

receiving a binding acknowledgement message from the home agent, the binding acknowledgement message containing a second authenticator data element; and     deriving a second shared secret from the second authenticator data element the second shared secret generated from the first shared secret using a second algorithm.

14. The method of claim 13, wherein the binding update message is a Mobile IP Version 6 (MIPv6) binding update message.

15. The method of claim 13, wherein the second shared secret comprises an integrity key.

16. The method of claim 13, wherein the second shared secret comprises a message authentication code.

17. The method of claim 13, comprising:
    encoding further messages using the second shared secret; and
    sending the encoded messages to the home agent.

18. A mobile node operable to establish a secured information packet communication between the mobile node in a first network and a home agent in a second network, the mobile node comprising:

a message processor configured to generate a first authenticator data element from a first shared secret using a first algorithm; and     a communication interface configured to:
        send a binding update message to the home agent, the binding update message containing the first authenticator data element; and
        receive a binding acknowledgement message from the home agent, the binding acknowledgement message containing a second authenticator data element;
    the message processor being further configured to derive a second shared secret from the second authenticator data element, the second shared secret generated from the first shared secret using a second algorithm.

19. The mobile node of claim 18, wherein the binding update message is a Mobile IP Version 6 (MIPv6) binding update message.

20. The mobile node of claim 18, wherein the second shared secret comprises an integrity key.

21. The mobile node of claim 18, wherein the second shared secret comprises a message authentication code.

22. The mobile node of claim 18, wherein:
the message processor is further configured to encode further messages using the second shared secret; and
the communication interface is further configured to send the encoded messages to the home agent.

* * * * *